Jan. 4, 1949.  E. C. LLOYD  2,457,828
MARINE FUEL SYSTEM
Filed Feb. 1, 1945  3 Sheets-Sheet 1

Inventor
Edward C. Lloyd.

By
*P. E. Bush*
Attorney

Jan. 4, 1949.   E. C. LLOYD   2,457,828
MARINE FUEL SYSTEM
Filed Feb. 1, 1945   3 Sheets-Sheet 2

Inventor
Edward C. Lloyd.
By
Attorney

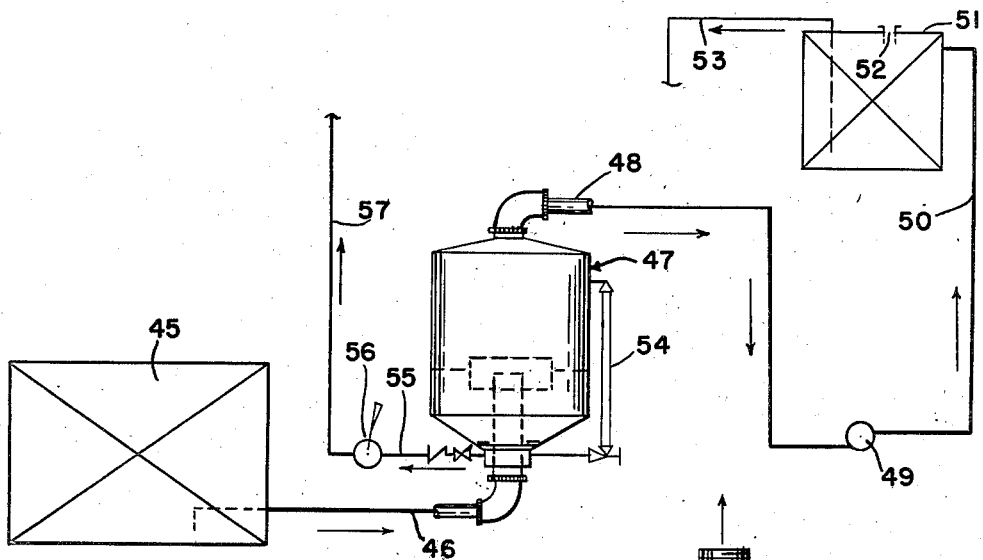
FIG 6
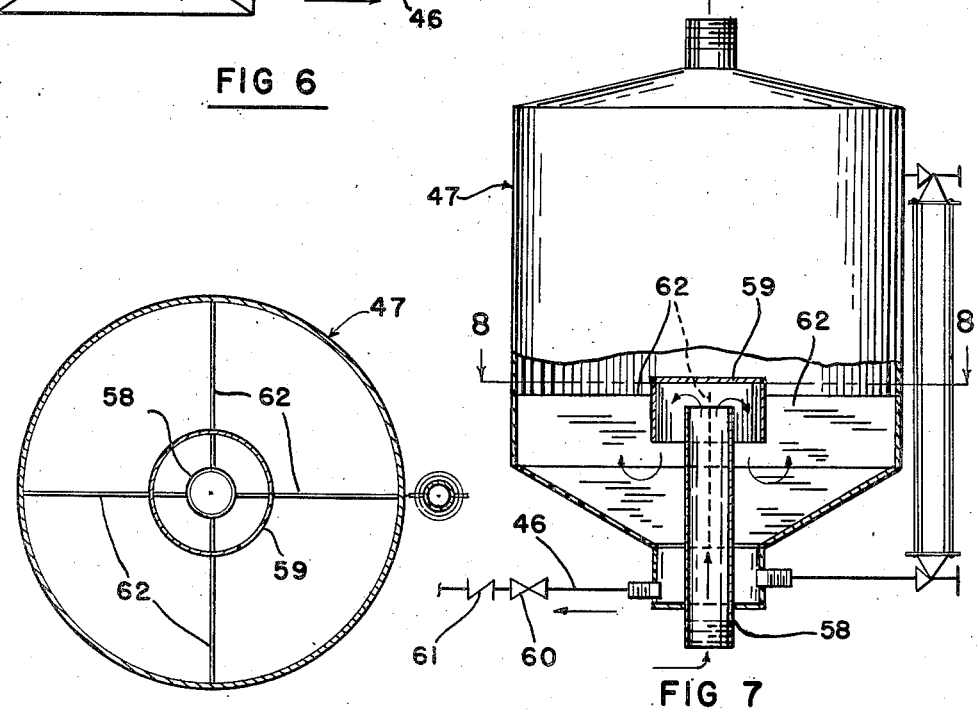
FIG 8
FIG 7
Inventor
EDWARD C. LLOYD

Patented Jan. 4, 1949

2,457,828

UNITED STATES PATENT OFFICE 2,457,828

MARINE FUEL SYSTEM

Edward C. Lloyd, Silver Spring, Md.

Application February 1, 1945, Serial No. 575,721

7 Claims. (Cl. 210—51)

(Granted under the act of March 3, 1883, as amended April 30, 1928; 370 O. G. 757)

This invention relates to fuel systems and more particularly to a new and improved water and air eliminating fuel system for ships, boats and small power driven craft.

In the operation of ships and boats and more particularly small craft which must cruise through rough water such as assault craft, patrol craft and the like which are powered by internal combustion engines using fuel oil, it is necessary to provide some means whereby water and air which are entrained in the fuel may quickly and positively be eliminated.

Heretofore it has been proposed to employ settling tanks or enlarged chambers through which the fuel may pass and wherein it is permitted to remain substantially quiescent so that the entrained air and water, being of different densities, may stratify and collect into their respective bodies.

However, a simple separator of the above construction is not effective under the conditions encountered in rough waters or during the rolling of a ship at sea at which time unfaltering operation of the power plant is most essential. It will be obvious that during rough weather a settling tank is so actively jolted and tossed about that the air, oil and water cannot stratify and are constantly being intermixed. The net result of the use of such a tank during rough weather is to provide an emulsion of air, water and oil which may clog the fuel lines and cause total power plant failure.

It is an object of the present invention to provide a water and air separator for fuel oil operated power plants wherein dependable and accurate separation of air, water and oil may be achieved under the rough conditions encountered by fuel systems installed in small craft.

It is a further object of the present invention to provide a new and improved separator tank which may readily be installed together with the necessary auxiliary equipment without greatly changing the conventional fuel system.

It is a further object of the present invention to provide new and improved details of water and air separator tank construction wherein the separation of air and water from fuel oil may be greatly facilitated.

An additional object of the present invention is to provide a relatively small, compact and readily serviced separator system having suitable indicators for showing air and water separation from the fuel and providing means operable promptly to eliminate said foreign substances from the fuel.

The present invention includes a tank or chamber located in the conventional fuel line in combination with auxiliary equipment and arranged so as to separate water and air from fuel oil primarily by means of the differential or settling action of gravity upon the fluids of different density within the separator. In addition the present device includes positive means for removing water and air from the separator, for indicating the quantities of oil, water and air within the separator and for preventing the back flow of air or water into the separator through the connections by which these fluids are removed.

Other objects and advantages will be hereinafter more fully described and for a complete understanding of the nature, scope and characteristics of this invention reference may now be had to the following description and accompanying drawings, in which latter Fig. 1 is a side elevation of one embodiment of the present invention used to remove water only;

Fig. 6 is a schematic drawing of another installation of the present invention;

Fig. 7 is a detailed side elevation partially broken away of another embodiment of the present invention; and Fig. 8 is a horizontal sectional view taken along a line substantially corresponding to line 8—3 of Fig. 7.

Figure 1:
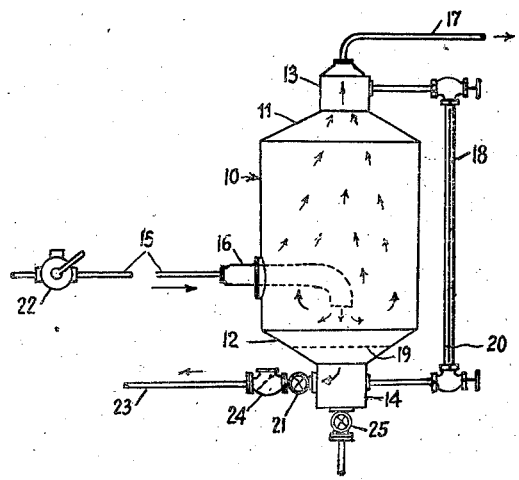

Referring to the embodiment illustrated in Fig. 1 a separator tank 10 is shown provided with upper and lower conical ends 11 and 12 each terminating in enlarged extensions 13 and 14 respectively.

The separator tank 10 may be of any suitable dimension depending upon the confines of the installation but in the embodiment shown it may be approximately 18 inches high and 15 inches in diameter. The opposed conical ends 11 and 12 are truncated right angle cones. The angle formed by the junction of the conical surface with the base of the cone may be of any desired degree. However, for satisfactory operation, it has not been found necessary to construct the conical ends with an angle between the conical surface of the ends 11 and 12 and the base of the cones greater than approximately 45°.

Figure 3:
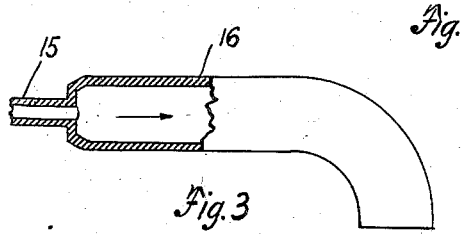
Fig. 3 is a detailed side elevation somewhat enlarged and with a portion broken away of the fuel inlet delivery spout of Figs. 1 and 2.

In use fuel oil is continuously drawn through the tank by operation, at a constant rate of flow, of a fuel pump connected to line 17. It enters through inlet line 15 by way of an enlarged downturned spoutlike inlet elbow 16 shown in detail in Fig. 3. During operation fuel oil is continually discharged into the tank through this elbow, reversing its direction 180° in the manner indicated by the arrows and is then forced up to the top of the tank, through the enlarged extension 13, and departing to the usual Diesel engine fuel pump through an outlet pipe 17.

A sight gauge glass 18 is connected as shown to the lower tank extension 14 and the upper tank extension 13. It will be apparent that upon the settling out of water in the bottom of the separator tank as by accumulation, as shown by means of a dotted line 19 in the lower inverted cone 12, there will be a corresponding indication of water in the gauge glass 18 as at 20. This reveals to the operator what the water level or "cleavage plane" is between the water and oil so that he may immediately take steps to forcibly expel the water from the tank.

In order to expel the water from the tank the operator first opens hand valve 21 and then operates auxiliary hand pump 22. The main flow is maintained during this operation and, since the flow of fuel withdrawn through the outlet line 17 is fixed at a rate equal to the constant rate of flow maintained by the pump connected to line 17, the auxiliary pump 22 acts to increase the flow in line 15 and to expel water from the chamber via water discharge line 23 at a rate corresponding to the difference in the pumping rates of the two pumps. The water so displaced flows through the opened valve 21 and through a water discharge line 23 to a place of disposal such as the bilge or overboard of the ship. A check valve 24 keeps any hydrostatic back pressure of waste water which may remain in the line 23 from returning to the separator tank when the auxiliary pump 22 is not being operated.

Hand pump 22 is of the well known construction which will not interfere with the flow of liquid therethrough when it is at rest. A drain valve 25 may be provided to permit complete drainage of the tank periodically as desired.

It will be apparent that with the construction just described the tank is at all times filled. This reduces agitation due to the motion of the tank as from rolling of a ship at sea; in addition the enlarged inlet elbow 16 reduces the velocity of the inlet fuel to prevent agitation of the tank contents thereby; the downturned end spout of the enlarged fuel inlet elbow slows the velocity of the incoming fuel and directs it downwardly where the tendency is for the heavier water particles to continue on to the body of water in the bottom of the tank while the fuel oil reverses its direction 180° and then passes upwardly; and the inlet and outlet, centrally located, provide a direct fuel circuit spaced from the side walls of the separator tank whereby moisture settling out on the side walls of the tank is not carried upwardly by the passing fuel.

The upward velocity of the fuel in the tank should preferably not exceed one-half of one foot per minute and the parts should be so dimensioned as to normally permit a rate of flow well below this figure.

As mentioned the angle at which the opposed cone shaped portions 11 and 12 are constructed should be as great with respect to horizontal as possible. It will be obvious that the area of the cleavage plane with respect to the quantity of moisture therein contained will be least when the angle of the cone 12 is greatest and by keeping this cleavage plane area at a minimum the tendency for the adjacent oil and water to intermix due to agitation is reduced.

Figure 2:
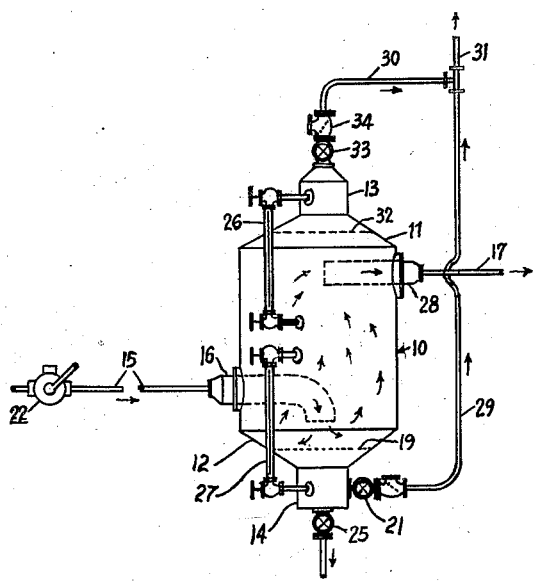
Fig. 2 is a side elevation of another embodiment of the present invention used to remove both water and air.

The embodiment illustrated in Fig. 2 is similar to the embodiment illustrated in Fig. 1 but includes in addition to the tank 10 and described fittings separate upper and lower sight glasses 26 and 27 for indicating air and oil, and water and oil cleavage planes respectively; a different outlet 28 leading to the fuel outlet line 17; and a combined water and air discharge system comprising outlet lines 29 and 30 which lead to a common overboard discharge line 31.

In operation the embodiment illustrated in Fig. 2 functions similar to the embodiment just described, however, by means of the sight glass 26 the cleavage plane 32 which forms between the fuel oil and the air which separates at the top of the tank in cone 11 can readily be observed. When air accumulates the operator may expel it by opening valve 33 and auxiliary pump 22 may be operated to temporarily increase the rate of flow into the tank 10. This increased flow forces the air out through valve 33 and check valve 34, line 30, and overboard through line 31 in a manner similar to that set forth in reference to the first embodiment for the ejection of water. In the embodiment illustrated in Fig. 2, water may also be ejected as set forth above in reference to the first embodiment and if desired both air and water may be ejected simultaneously from opposite ends of the tank in the event the presence of both is determined through the sight glasses 26 and 27.

It will be apparent that in this embodiment a single sight gauge would not accurately indicate both upper and lower cleavage planes and the water would trap the gauge and keep the fuel oil level from accurately being measured. Also, the sight gauge connections lead into the extensions 13 and 14 and not into the lines 17 and 23. These enlarged extensions prevent the gauge reading from being affected by the velocity of the fuel flow through the tank.

Figure 5:
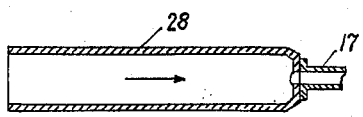
Fig. 5 is a detailed vertical cross section somewhat enlarged of the fuel outlet shown in the embodiment of Fig. 2.

The enlarged fuel oil inlet 16 in the embodiment of Fig. 2 functions in the manner heretofore described with regard to the embodiment of Fig. 1, however, the outlet 28 shown in detail in Fig. 5 is preferably an enlarged tubular projection which extends into the central portion of the tank 10 and is preferably located at a considerable distance below the lowest point to which the cleavage plane 32 between the air and oil might reach. The enlarged outlet construction 28 prevents the establishment of currents in the fuel oil inasmuch as the oil enters the outlet at very low velocity. Also, the location of this outlet at a point centrally of the tank 10 and spaced from the side walls of the tank prevents the entrapment in the outgoing fuel of water particles which may condense out and drain down the side walls of the tank 10.

Figure 4:
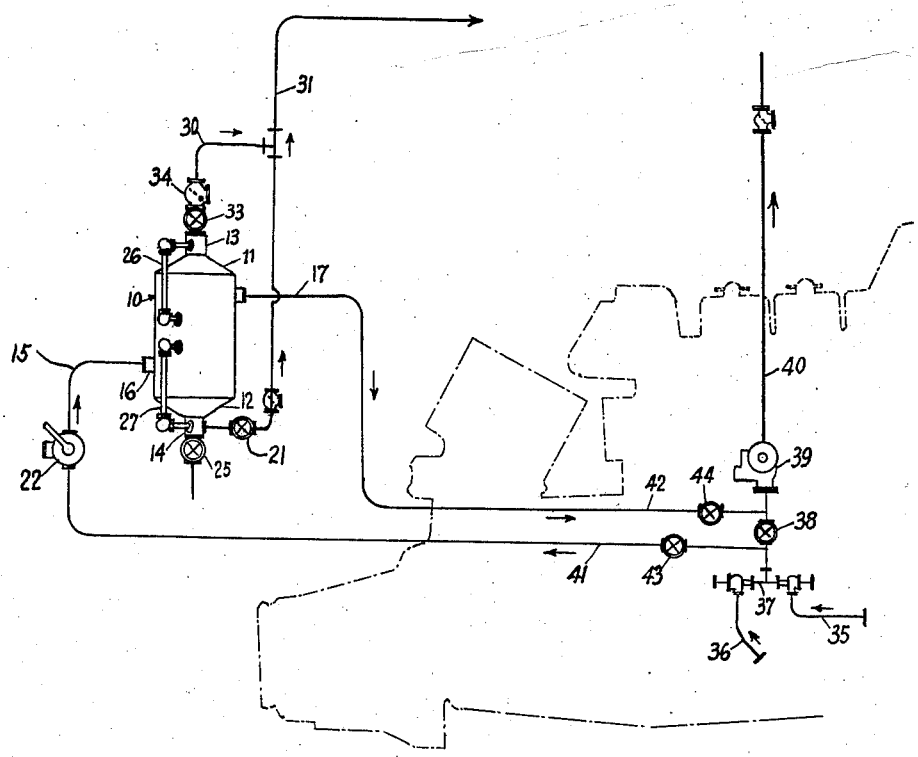
Fig. 4 is a schematic drawing of an installation showing the embodiment of Fig. 2 installed for use.

The preferred method of installing a settling tank constructed in accordance with the present invention is shown in Fig. 4. In this figure a conventional Diesel engine is outlined and shown provided with fuel supply lines 35 and 36 which join at 37 and deliver fuel through control valve 38 to a fuel pump 39 for distribution to the respective cylinders. An over-flow pipe 40 returns the excess fuel to the fuel tank. In the installation of the present invention lines 41 and 42 having control valves 43 and 44 respectively are preferably connected to opposite sides of the shut-off valve 38. By this construction shut-off valve 38 may be closed and valves 43 and 44 opened to direct the fuel oil through the settling tank 10 of the present invention.

The settling tank is preferably located on the inlet side of the fuel pump 39 so that there is no possibility of the fuel pump emulsifying and distributing air and water throughout the fuel.

In determining the proportions to be employed in the proposed fuel settling tank the aforementioned importance of the angle of the cones 11 and 12 should be borne in mind and in addition the inlet and outlet flow of fuel oil should be such that the velocity of fall of the particles of water is substantially greater than the velocity with which the fuel rises in the tank.

In Figs. 6, 7 and 8 is shown another embodiment of the present invention wherein the fuel with its entrained moisture enters a chamber from below through a centrally disposed standpipe and is deflected by a suitable baffle arrangement.

Fig. 6 shows an installation wherein fuel is conducted from a storage tank 45 through line 46 into the bottom of a separating chamber 47 wherein the moisture is separated by the means hereinbefore described. Thereafter the fuel leaves through the top of the tank by outlet line 48 and is pumped by power pump 49 through line 50 into a small ready supply tank 51 which may be open to the atmosphere as by means of vent 52. From tank 51 fuel is then withdrawn through line 53 as required for Diesel engine operation. If desired, pump 49 may be arranged to discharge directly to the engine via line 50, and tank 51 may be omitted.

A sight gauge 54 may be used to reveal the presence of water within the chamber 47 and, when the presence of water is indicated it may be withdrawn through pipe 55 by manual operation of an auxiliary hand pump 56. The water withdrawn by means of this pump may be directed overboard through a discharge line 57.

Figs. 7 and 8 show the details of a modified tank inlet construction which is also shown in the installation of Fig. 6. However, it will be realized that the installation of Fig. 6 may be used in connection with other separating devices of the present invention.

As shown in detail in Fig. 7 the fuel may be admitted through the bottom end of a fuel inlet standpipe 58 and, when discharged from the top thereof the fuel is deflected downwardly by means of an inverted cup like baffle 59. After leaving the lower edge of the baffle the fuel flow again reverses to flow upwardly. As in the previous embodiments the moisture entrained within the fuel tends to separate at this point and collect in the cone shaped lower portion of the chamber 47 from which it may be drawn off through line 55. Hand valve 60 and check valve 61 in line 55 function as in the embodiments previously discussed.

In order to reduce to a minimum the lateral and rotational movement of the fluid within the chamber 47 a plurality of vertical baffles 62 may be provided as shown and are disposed radially about the standpipe as illustrated in Fig. 8. These vertical baffles divide the conical lower portion of the chamber 47 into smaller areas and thus reduce the surging or shifting tendencies of the fuel at this point where the water and oil cleavage plane occurs.

From the foregoing description it will be apparent to those skilled in the art that various modifications thereof may be made without departing from the spirit and scope of this invention and it is desired, therefore, that the same be limited only by the appended claims.

The invention described herein may be manufactured and used by or for the Government of the United States of America for governmental purposes without the payment of any royalties thereon or therefor.

Having thus described the invention, what is claimed and desired to be secured by Letters Patent is:

1. A fluid separating system for fluids of different specific gravities comprising, a pump, a fluid supply line leading to the pump, a closed chamber in which said fluids separate by gravity interposed in said supply line, said chamber having an inlet delivering into the chamber, a main fluid outlet delivering fluid of one specific gravity from the chamber through said supply line to the pump, an auxiliary outlet for fluid of another specific gravity delivering from the chamber, valve means for said outlet, and means for increasing the rate of flow into the chamber to a value greater than the rate of flow from the chamber to the pump to forceably expel said fluid of another specific gravity from the chamber through the auxiliary outlet when said valve means is open, the last said means comprising a second pump interposed in the portion of said fluid supply line leading to the chamber.

2. A fluid separating system for mixture of liquid fuel and other fluids of specific gravities differing from that of fuel, a closed chamber, a pump connected to said chamber and adapted to draw fuel therefrom, outlet means in said chamber for fluids of specific gravities differing from that of fuel, a valve in said outlet means for controlling discharge through said outlet means, inlet means for admitting a mixture of fuel and other fluids to said chamber, and a second pump attached to one of said means to increase the flow of fluids into said chamber, whereby said fluids may be vented from said chamber when said valve is opened.

3. A fluid separating system comprising a closed tank within which fluids of different specific gravities may separate, inlet means for admitting a mixture of said fluids to said tank, outlet means spaced from said inlet means for drawing fluid of one specific gravity from said tank, pumping means for removing said fluid of one specific gravity from said tank through said outlet means at one rate, a second outlet for fluid of another specific gravity, valve means permitting discharge of fluid through said second outlet, a second pump means operable to cause said mixture of fluids to flow into said tank at a rate in excess of the rate of withdrawal through said outlet means, whereby said other fluid is discharged through said second outlet when said second pumping means is operated.

4. A fluid separating system as claimed in claim 3, and vertically disposed baffles within said tank adjacent said second outlet, said baffles being spaced from the upper and lower ends of said tank and adapted to intersect the cleavage plane between the separated fluids.

5. A fluid separating system comprising a closed tank within which a mixture of fluids of different specific gravity may separate, inlet means for admitting said fluids to said tank, outlet means spaced from said inlet means for fluid of one specific gravity, pumping means for removing said fluid of one specific gravity from said tank through said outlet means at one rate, a second outlet for fluid of another specific gravity, valve means permitting discharge of fluid through said second outlet, flow varying means operable to force said mixture of fluids through said inlet means at a rate in excess of said one rate whereby to vent said other fluid therethrough when said flow varying means is operated.

6. A fluid separating system comprising a closed tank within which a mixture of fluids of different specific gravities may separate, inlet means for admitting said mixture of fluids into said tank, outlet means spaced above said inlet means for drawing fluid of one specific gravity from said tank, pumping means for removing said fluid of one specific gravity from said tank through said outlet means at an independent rate of flow, a second outlet spaced below said inlet means for fluid of a greater specific gravity than said fluid of one specific gravity, valve means operable to control flow of said second mentioned fluid through said second outlet, a third outlet spaced above said outlet means for fluid of a lesser specific gravity than said fluid of one specific gravity, a second valve means for controlling flow of fluid through said third outlet, and means operable to increase the rate of flow of said mixture of fluids into said tank to a rate in excess of the rate of withdrawal through said first mentioned outlet means by discharge through either of said valve means whereby said fluids of greater or less specific gravity may be discharged from said tank.

7. A fluid separating system for separating fuel oil from lighter and heavier fluids mixed therewith comprising a fuel supply, a closed tank having opposed cone shaped top and bottom members having fluid outlets therein, valves operable to control said outlets, inlet means delivering said fluids and fuel oil into said tank, a conduit connecting said tank to said fuel supply, fuel outlet means between said fluid inlet means and said top fluid outlet means, a fuel pump for removing fuel from said tank through said fuel outlet, and a second pump in said conduit, said second pump having a capacity greater than said fuel pump whereby operation thereof when said valves are opened will force said separated lighter and heavier fluids through said fluid outlets.

EDWARD C. LLOYD.

REFERENCES CITED

The following references are of record in the file of this patent:

UNITED STATES PATENTS

| Number | Name | Date |
|---|---|---|
| 329,791 | Westinghouse | Nov. 3, 1885 |
| 603,548 | Applegate | May 3, 1898 |
| 631,371 | Kithcart et al. | Aug. 22, 1899 |
| 640,494 | Skinner et al. | Jan. 2, 1900 |
| 1,069,789 | Kelly, Jr. | Aug. 12, 1913 |
| 1,079,398 | Coakley et al. | Nov. 25, 1913 |
| 1,159,044 | Kelly, Jr. | Nov. 2, 1915 |
| 1,333,197 | Arzinger | Mar. 9, 1920 |
| 1,461,687 | Strobel | July 10, 1923 |
| 1,494,906 | Haynes | May 20, 1924 |
| 1,708,021 | Lenz et al. | Apr. 9, 1929 |
| 2,083,861 | Padgett | June 15, 1937 |

FOREIGN PATENTS

| Number | Country | Date |
|---|---|---|
| 504,220 | France | Apr. 8, 1920 |